United States Patent
Netzer et al.

(10) Patent No.: US 12,474,906 B2
(45) Date of Patent: Nov. 18, 2025

(54) AUTOMATIC RUNTIME EXECUTION HARDENING THROUGH STATIC SYSTEM APPLICATION PROGRAMMING INTERFACE (API) DATA MAPPING

(71) Applicant: Microsoft Technology Licensing, LLC, Redmond, WA (US)

(72) Inventors: Yair Netzer, Ganei Tlkvah (IL); Ben Hania, Herzliya (IL); Igor Gokhman, Tel Aviv (IL); Tomer Shaiman, Raanana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 18/311,461

(22) Filed: May 3, 2023

(65) Prior Publication Data
US 2024/0338185 A1    Oct. 10, 2024

Related U.S. Application Data

(60) Provisional application No. 63/495,220, filed on Apr. 10, 2023.

(51) Int. Cl.
*G06F 9/44* (2018.01)
*G06F 8/41* (2018.01)
(Continued)

(52) U.S. Cl.
CPC .............. *G06F 8/433* (2013.01); *G06F 8/447* (2013.01); *G06F 9/541* (2013.01); *G06F 8/77* (2013.01); *G06F 9/54* (2013.01); *G06F 9/547* (2013.01)

(58) Field of Classification Search
CPC . G06F 8/433; G06F 8/447; G06F 8/77; G06F 9/541; G06F 9/547; G06F 9/54
See application file for complete search history.

(56) References Cited

U.S. PATENT DOCUMENTS

| | | | |
|---|---|---|---|
| 6,957,422 B2 * | 10/2005 | Hunt | ................... H04L 41/0233 717/172 |
| 2012/0240236 A1 | 9/2012 | Wyatt et al. | |

(Continued)

FOREIGN PATENT DOCUMENTS

WO    2018023368 A1    2/2018

OTHER PUBLICATIONS

International Search Report and Written Opinion received for PCT Application No. PCT/US2024/022695, Jul. 3, 2024, 10 pages.

*Primary Examiner* — Anibal Rivera

(57) ABSTRACT

Systems and methods are provided for implementing automatic runtime execution hardening for software programs undergoing software development. In various embodiments, a computing system performs automatic enforcement profile generation within a software development environment in which source code of a software program is compiled or translated to create an executable software program. Automatic enforcement profile generation includes accessing, from a data storage device, an artifact associated with the software program, statically analyzing the artifact (including machine code) associated with the software program without executing the software program, and generating system API usage data based on the analysis. A platform-specific enforcement profile for a secure mode hardening feature is created based on the system API usage data and platform configuration data. When applied to the software program, the platform-specific enforcement profile defines actions (including system calls) that the software program is allowed to perform, while blocking other actions (including other system calls).

20 Claims, 6 Drawing Sheets

(51) Int. Cl.
*G06F 8/77* (2018.01)
*G06F 9/54* (2006.01)

(56) References Cited

U.S. PATENT DOCUMENTS

2020/0242251 A1\* 7/2020 Wisgo ................... G06F 21/564
2023/0214533 A1\* 7/2023 Hecht .................... G06F 21/52
　　　　　　　　　　　　　　　　　　　726/1

\* cited by examiner

AUTOMATIC RUNTIME EXECUTION HARDENING THROUGH STATIC SYSTEM APPLICATION PROGRAMMING INTERFACE (API) DATA MAPPING

CROSS-REFERENCE TO RELATED APPLICATIONS

This application claims the benefit of U.S. Provisional Application No. 63/495,220 filed Apr. 10, 2023, entitled "Automatic Runtime Execution Hardening Through Static System Application Programming Interface (API) data mapping," which is incorporated herein by reference in its entirety.

BACKGROUND

As software programs have grown in complexity and as software and computing systems have become targets of attack and misuse, hardening software programs has become more important. Current approaches for hardening software programs, however, require manual generation of enforcement profiles, specific technical knowledge about the enforcement profiles, and specific configuration for each platform as enforcement profiles are platform specific. It is with respect to this general technical environment to which aspects of the present disclosure are directed. In addition, although relatively specific problems have been discussed, it should be understood that the examples should not be limited to solving the specific problems identified in the background or elsewhere in this disclosure.

SUMMARY

The currently disclosed technology, among other things, provides for a system and a method for implementing automatic runtime execution hardening through static system application programming interface ("API") data mapping. In examples, a software development system or a control system of a software development system (collectively, "computing system") generates an enforcement profile within a software development environment in which either source code of a software program is compiled to create an executable software program or source code of the software program is translated into an executable programming or scripting language without compiling into a machine language program. The enforcement profile can function on any call to the operating system whether from script language, interpreted language, native language, etc. When generating an enforcement profile, the computing system accesses (e.g., receives or pulls), from a data storage device, an artifact associated with the software program. The computing system then analyzes the artifact associated with the software program, without executing the software program, and generates system API usage data based on the analysis. The computing system accesses platform configuration data from the data storage device, and creates a platform-specific enforcement profile for a secure mode hardening feature based on the system API usage data and the platform configuration data. The platform-specific enforcement profile is then stored on (e.g., pushed to) the data storage device. When applied to the software program, the platform-specific enforcement profile defines actions (including system calls) that the software program is allowed to perform, while blocking other actions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

DETAILED DESCRIPTION OF CERTAIN EMBODIMENTS

Figure 1:
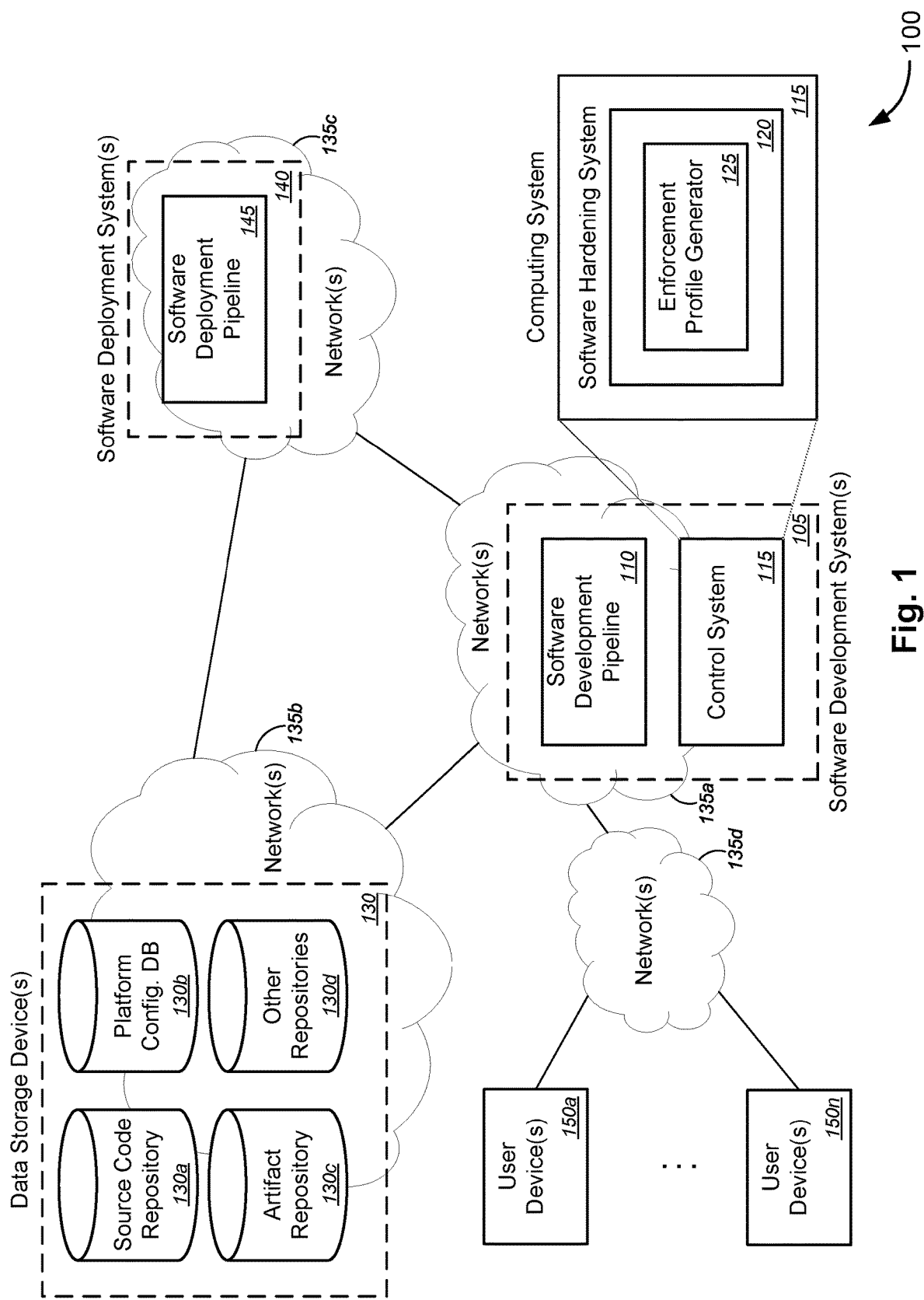
FIG. 1 depicts an example system for implementing automatic runtime execution hardening for software programs undergoing software development and/or deployment.

Enforcement profiles, such as secure mode profiles, can be used to prevent a compromised program from accessing sensitive information, modifying files, or making network connections, thereby protecting the system from potential harm caused by compromised programs. Generating an enforcement profile, however, can be challenging as it requires a thorough understanding of the program's behavior and the system calls it utilizes. Some enforcement profiles, such as seccomp profiles, are also platform-sensitive, so configurations for the test platform or development platform that are used for generating the enforcement profiles must match configurations for the deployment platform or end-use system platform that are to be protected by the features of the enforcement profiles. Otherwise, the enforcement profiles will be ineffective for its designed purposes. Also, balancing security with functionality is important, as too loose a profile (e.g., a profile that is too relaxed or too lenient) fails to provide any actual hardening (which may indirectly lead to vulnerabilities), while too strict a profile may prevent the program from functioning as intended by the program's developers.

For general software development, code changes are stored on (e.g., pushed to) a (source) code repository, prior to a build process during which either source code of the program is compiled (which includes compilation and linking) to create an executable software program or source code of the software program is translated into an executable programming or scripting language without compiling into a machine language program. The build process is dependent on specific platform configurations. Artifacts produced during the build process are stored in an artifact storage device or artifact repository. A repository, as used herein, whether (source) code repository, artifact repository, etc., refers to a location in which data is stored and managed, in some cases, a central location. An artifact, as used herein, refers to one of a plurality of types of by-products or process-based files or documents that are produced during development and/or release of the software program. Artifacts may include executable files, library files, binaries, data files, configuration files, data models, deployment scripts, database definitions, input files, and/or other types of files that are needed to run the program. The artifact storage device stores build artifacts, configuration files (including platform configurations) and other data that is consumed by other components of the system later in the pipeline. After the build process, the program is deployed into one or more various environments or systems including test systems, pre-production environments, production environments, on premises environments, cloud environments, and/or governed cloud environments, and/or the like. A pipeline, as used herein, refers to a process that drives software development through a path of building, testing, and/or deploying code. The pipeline, may refer to a continuous integration and continuous deployment ("CI/CD") pipeline, which is a series of processes or steps that are performed to deliver a new version of software, or may refer to at least one of a build pipeline (or software development pipeline) or a release pipeline (or software deployment pipeline). The build pipeline and the release pipeline include or provide a respective software development environment and software deployment environment.

To harden programs, general solutions include a developer or user first establishing or using a test pipeline, which includes a test environment. Within the test pipeline, the developer or user manually downloads binary artifacts of a program and uses analysis tools to generate raw system application programming interface ("API") usage data for the program. In some instances, the analysis tools capture the program's interaction with an operating system ("OS"). The raw system API usage data is converted into a platform-specific profile. In some cases, during such conversion, raw system call numbers are converted to names according to a target OS. Such names, however, may differ between the OS version, the build version, etc. Also, during such conversion, a configuration file is created that is supported by a relevant hardening feature (e.g., enforcement profile) of a current deployment. The developer or user subsequently manually stores (e.g., pushes) the platform-specific profile back on the artifact storage device. During deployment (within a release pipeline, which includes a software deployment environment), the platform-specific profile is accessed (e.g., received or pulled) from the artifact storage device and applied to the program to harden the program. The hardened program is then deployed.

The general solutions, however, require the developer or user to set up a dedicated test environment for the binary analysis and profile generation. Manual generation of enforcement profiles using external tools requires significant engineering time and effort on every code change, which requires the developer or user to possess specific technical knowledge about enforcement profiles. In some cases, specific configuration is required for each platform, as enforcement profiles are platform specific. In other cases, a comprehensive test suite is needed to be written by the developer or user, which may result in incomplete profiles that do not cover all cases due to users usually missing some code flows. Also, every time that the code changes, the test suite must be updated accordingly, and the enforcement profile must be re-generated and thoroughly tested, which requires significant engineering work.

The present disclosure provides a solution that improves reliability and enables massive scalability to repositories without incurring significant additional engineering effort. In embodiments of the present disclosure, automatic enforcement profile generation is implemented within a software development environment in which either source code of a software program (e.g., a software application, a software package, or an operating system) is compiled to create an executable software program or source code of the software program is translated into an executable programming or scripting language without compiling into a machine language program. After creation of the executable software program, the system accesses (e.g., receives or pulls) artifacts that are associated with the executable software program from an artifact storage device.

The system performs a static system call analysis, by analyzing binaries of the software program without executing the software program. A binary, as used herein, refers to a file that contains machine code of a software program for a computing system to execute. In some cases, the binary, which as described above is an artifact of the software program, is also a compilation or translation output that is used as input for the automatic enforcement profile generation. Other inputs for the automatic enforcement profile can include other artifacts (e.g., configuration data, data files, input files, model files). As part of this static analysis process, a control flow graph ("CFG") is created to represent the possible paths of execution within the software program. The CFG is generated by analyzing the software program's binaries and scanning for all possible control flow paths, starting from every entry point in the main binary and any libraries it uses. The CFG is used to find all invocations of system calls in all of the software program's possible code paths. Because the analysis considers all possible code paths, the result is an exhaustive list of system calls the software program might use. The static system call analysis for the automatic enforcement profile generation differs from dynamic system call analysis, which uses a recording tool to produce a list of used system calls during runtime of an executed software program. In order to produce such a list, an exhaustive test suite must be created that will result in every system call being used. Thus, dynamic analysis requires significant manual engineering work and multiple iterations on every code change to obtain an exhaustive code coverage test suite.

Based on the static analysis, the system outputs system API usage data directly to the next stage in the process. In examples, a wrapper function is used (a) to access (e.g., receive or pull) the artifacts automatically from the artifact storage device, (b) to implement the analysis tools, and (c) to output the system API usage data.

The system autonomously accesses platform configuration data or the platform configurations themselves (collectively, "platform configurations") from the artifact storage device, and utilizes the platform configurations in combination with the system API usage data to create a platform-specific enforcement profile (e.g., a seccomp profile). The resultant platform-specific enforcement profile is stored on (e.g., pushed to) the artifact storage device for further consumption by the release or deployment pipeline, and is applied to the running executable software program.

As should be appreciated from the disclosure herein, the present technology provides multiple technical benefits and solutions to technical problems. For instance, hardening software programs from becoming targets of attack and misuse generally raises multiple technical problems. For example, one technical problem is that current approaches for hardening software programs require manual generation of enforcement profiles. Another technical problem is that specific technical knowledge about the enforcement profiles is needed by developers or users manually generating the enforcement profile. Yet another technical problem is that, because enforcement profiles are platform specific, specific configuration for each platform is required and re-generation of the profile is needed if the platforms for the test environment and the deployment environment differ. Manually enabling hardening for every project in large companies with huge portfolios of applications or in large or small companies developing fast changing products is not scalable. Still another technical problem is the need to re-validate and re-run manual generation profiles for each code change.

The present technology provides for automatic enforcement profile generation within a software development environment in which either source code of a software program is compiled to create an executable software program or source code of the software program is translated into an executable programming or scripting language without compiling into a machine language program. When performing automatic enforcement profile generation, the computing system receives or accesses, from a data storage device, artifacts associated with the software program. The computing system then analyzes the artifacts associated with the software program, without executing the software program, and generates system API usage data based on the analysis. The computing system receives or accesses platform configuration data from the data storage device and creates a platform-specific enforcement profile for a secure mode hardening feature based on the system API usage data and the platform configuration data. The platform-specific enforcement profile is then stored on or to the data storage device. When applied to the software program, the platform-specific enforcement profile defines actions (including system calls) that the software program is allowed to perform, while blocking other actions.

In this manner, there is no need for development and maintenance of a comprehensive test suite to produce enforcement profiles. The enforcement profile generation process, when automated, allows for creation of enforcement profiles in a more efficient and more accurate manner because such process is less likely to miss a system call. After an initial setup, profile generation is (completely) automatic for all future code changes. The platform information that is used by the build or development pipeline is utilized for the static analysis and profile generation, as these processes take place within the build or software development environment itself, according to the various embodiments. Enforcement profiles can be easily generated even for outdated or unmaintained repositories. The examples described herein are also easily scalable to a large number or all repositories of an entity (e.g., private entity, business entity, government entity, and so on), without incurring significant additional engineering effort. Also, for network edge devices, which are less secure dedicated hardware appliances, the automatic profile generation process can enable hardening of software running on such hardware against AI applications running thereon, even if the AI applications have been compromised.

Various modifications and additions can be made to the embodiments discussed without departing from the scope of the disclosure. For example, while the embodiments described above refer to particular features, the scope of this disclosure also includes embodiments having different combination of features and embodiments that do not include all of the above-described features.

We now turn to the embodiments as illustrated by the drawings. FIGS. 1-5 illustrate some of the features of the method, system, and apparatus for implementing software development and/or deployment, and, particularly, to methods, systems, and apparatuses for implementing automatic runtime execution hardening for software programs, and, more particularly, to methods, systems, and apparatuses for implementing automatic runtime execution hardening for software programs through static system API data mapping, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing automatic runtime execution hardening for software programs undergoing software development and/or deployment. System 100 includes a software development system 105 (also referred to as a "build system" or "continuous integration or CI system"), which includes a software development pipeline (also referred to as a "build pipeline") 110 and a control system 115. In some cases, the software development pipeline 110 and the control system 115 may be integrated as a single system or platform. In other examples, the software development pipeline 110 and the control system 115 are embodied as separate systems. In examples, the software development pipeline 110 provides the software development environment in which software programs are created, while the control system 115 orchestrates, manages, or controls the software development process and also provides interface with user devices (such as user devices 150a-150n (collectively, "user devices 150"). In some examples, the control system 115 includes a software hardening system 120, which may include an enforcement profile generator 125. The software hardening system 120 is used to improve or enhance security of software programs, in some cases, by utilizing the enforcement profile generator 125 to create enforcement profiles that protect systems on which the software programs are executed. The enforcement profiles protect these systems by defining actions (including system calls) that the software program is allowed to perform, while blocking other actions.

System 100 further includes one or more data storage devices 130, which may include at least one of a source code repository 130a, a platform configuration database 130b, an artifact repository 130c, or other repository 130d. In some examples, the source code repository 130a stores source code for software programs and source code changes, while the platform configuration database 130b stores platform configurations or platform configuration data for computing platforms on which software programs are developed and/or deployed (and executed). The artifact repository 130c stores build artifacts, configuration files (e.g., platform configurations), and other data that is consumed by components within the software development system 105 and/or the software deployment system 140. In examples, source code (e.g., C, C++) is compiled or translated into binaries or executables, which include machine code or binary code. The binaries in the software development pipeline 110 and software deployment pipeline 145 are themselves artifacts, and are stored in the artifact repository 130c. Additionally, source code changes are also stored in the source code repository 130a, which uses source-control systems (e.g., Git) to manage a change history of the source code. When the software development pipeline 110 accesses (e.g., receives or pulls) code from this source code repository 130a, it accesses a specific version, which is defined in the pipeline configuration. In an example, the source code repository 130a, the platform configuration database 130b, the artifact repository 130c, or the other repository 130d are separate databases. In another example, two or more of the source code repository 130a, the platform configuration database 130b, the artifact repository 130c, or the other repository 130d are part of the same database. In yet another example, the source code repository 130a, the platform configuration database 130b, the artifact repository 130c, or the other repository 130d are each part of the same database.

System 100 further includes a software deployment system 140 (also referred to as a "release system" or "continuous deployment (CD) system"), which includes a software deployment pipeline 145 (also referred to as a "release pipeline"). The software deployment system 140, in some cases, may include APIs for deploying software programs to virtual resources, such as virtual machines ("VMs") and container orchestration systems (e.g., Kubernetes® container orchestration system). The software development system 105, the one or more data storage devices 130, and the software deployment system 140 may be disposed or located within networks 135a, 135b, and 135c, respectively. In some examples, the software development system 105, the one or more data storage devices 130, and the software deployment system 140 are distributed across a plurality of networks within networks 135a, 135b, and 135c. In an example, the software development system 105, the one or more data storage devices 130, and the software deployment system 140 are disposed or located within the same network 135. In another example, the software development system 105, the one or more data storage devices 130, and the software deployment system 140 are disposed or located within different networks 135a, 135b, and 135c. In yet another example, two of the software development system 105, the one or more data storage devices 130, and the software deployment system 140 are disposed or located within the same network 135. In some embodiments, the user devices 150a-150n access and/or control one or more of the software development system 105 and/or the software deployment system 140, in some cases, via user interfaces ("UIs") and via network(s) 135d (which may be an access network, or the like). In an example, the networks 135a-135d are the same network. In another example, the networks 135a-135d may each be different networks. In yet another example, two or more (but not all) of the networks 135a-135d are the same network.

In some examples, the control system 115 includes at least one of a secure computing mode profile generator, a software security system, or a software hardening system. In some examples, the control system 115 may be implemented as a cloud computing system. Networks 135a-135d (collectively, "network(s) 135") may each include a distributed computing network(s), such as the Internet, a private network(s), a commercial network(s), or a cloud network(s), and/or the like. In some instances, the user devices 150 each include a desktop computer, a laptop computer, a tablet computer, a smart phone, a mobile phone, or any suitable device capable of communicating with network(s) 135 or with servers or other network devices within network(s) 135. In some examples, the user devices 150 each include any suitable device capable of communicating with at least one of the software development system 105 and/or the control system 115, and/or the like, via a communications interface. The communications interface may include a web-based portal, an API, a server, a software application, or any other suitable communications interface (not shown), over network(s) 135.

Figure 2:
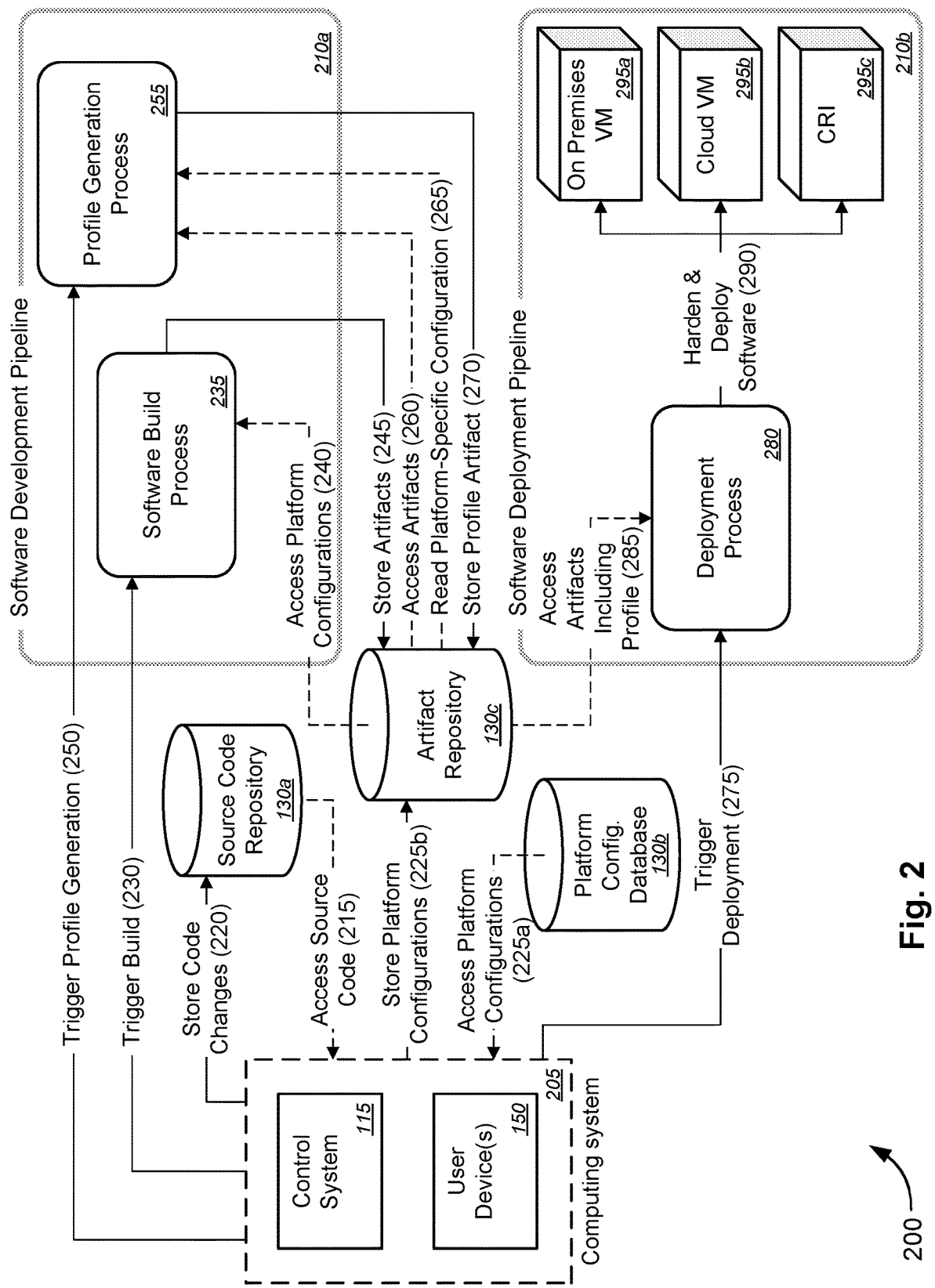
FIG. 2 depicts a block diagram illustrating an example data flow for implementing automatic runtime execution hardening for software programs undergoing software development and/or deployment.
Figure 3:
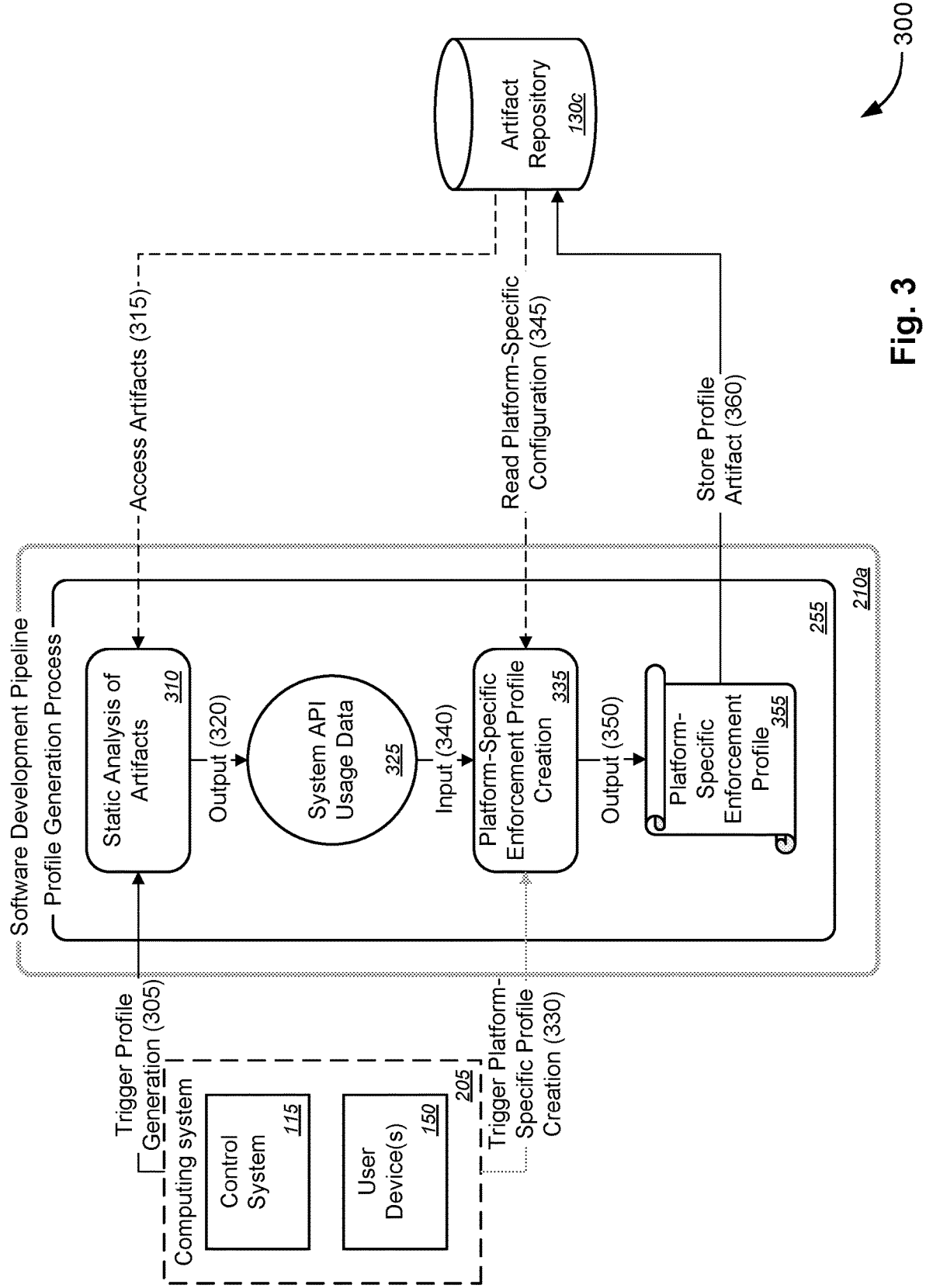
FIG. 3 depicts a block diagram illustrating an example data flow for implementing automatic runtime execution hardening for software programs.

In operation, the software development system 105, the control system 115, the software deployment system 140, and/or user devices 150 (collectively, "computing system") may perform methods for implementing automatic runtime execution hardening for software programs undergoing software development and/or deployment, as described in detail with respect to FIGS. 2-4. For example, data flows as described below with respect to FIGS. 2 and 3 may be applied with respect to the operations of system 100 of FIG. 1.

FIG. 2 depicts a block diagram illustrating an example data flow 200 for implementing automatic runtime execution hardening for software programs undergoing software development and/or deployment. In FIG. 2, computing system 205 includes control system 115 and/or user device(s) 150. In the example data flow 200 of FIG. 2, software development pipeline 210a, control system 115, source code repository 130a, platform configuration database 130b, artifact repository 130c, software deployment pipeline 210b, and user device(s) 150 may be similar, if not identical, to software development pipeline 110, control system 115, source code repository 130a, platform configuration database 130b, artifact repository 130c, software deployment pipeline 145, and user devices 150a-150n, respectively, of system 100 of FIG. 1. The description of these components of system 100 of FIG. 1 are similarly applicable to the corresponding components of FIG. 2.

With reference to the example data flow 200 of FIG. 2, computing system 205 interacts or interfaces with each of a software development pipeline 210a (which includes or provides a software development environment), a software deployment pipeline 210b (which includes or provides a software deployment environment), a source code repository 130a, a platform configuration database 130b, and an artifact repository 130c. In particular, computing system 205 accesses (e.g., receives or pulls) source code of a software program from source code repository 130a, at operation 215, and stores (e.g., pushes) code changes on the source code repository 130a, at operation 220. The computing system 205 stores, at operation 225b, platform configurations, which may be user-configured and which may be stored in (and accessed, at operation 225a, from) the platform configuration database 130b, to the artifact repository 130c. At operation 230, the computing system 205 triggers a software build process 235, in which either the source code of the software program is compiled to create an executable software program or the source code of the software program is translated into an executable programming or scripting language without compiling into a machine language program. During the software build process 235, the platform configurations are accessed from the artifact repository 130c, at operation 240, and the artifacts that are used and/or produced during the build process are stored on the artifact repository 130c, at operation 245.

At operation 250, the computing system 205 triggers a profile generation process 255, which is performed within the software development pipeline 210a along with the software build process 235. During the profile generation process 255, the artifacts are accessed from the artifact repository 130c (at operation 260), the platform-specific configurations are read or accessed from the artifact repository 130c (at operation 265), and the resultant profile artifacts (e.g., artifacts of the platform-specific enforcement profile that is generated by the profile generation process 255) are stored on the artifact repository 130c (at operation 270). The profile generation process 255 is described in greater detail below with respect to the data flow 300 of FIG. 3.

At operation 275, the computing system 205 triggers a deployment process 280, which is performed within the software deployment pipeline 210b. In an example, the software deployment pipeline 210b is separate from the software development pipeline 210a. In other examples, the software deployment pipeline 210b and the software development pipeline 210a are part of a single pipeline (e.g., a CI/CD pipeline). During the deployment process 280, the artifacts including the profile (e.g., the platform-specific enforcement profile) are accessed from the artifact repository 130c, at operation 285. At operation 290, the deployment process 280 further includes hardening the software program by applying the profile to the software program and deploying the hardened software program to, e.g., on premises VMs 295a, cloud VMs 295b, and/or a container runtime interface ("CRI") 295c. In some examples, CRI 295c includes a container orchestration system (e.g., Kubernetes® container orchestration system) and/or a container system without orchestration (e.g., Docker® container platform). When applied to the software program, the profile defines actions that the software program is allowed to perform, while blocking any other actions, thereby protecting the system on which the software program is deployed.

FIG. 3 depicts a block diagram illustrating an example data flow 300 for implementing automatic runtime execution hardening for software programs. FIG. 3 illustrates in detail the processes that occur during the profile generation process 255 of FIG. 2. In the example data flow 300 of FIG. 3, control system 115, user device(s) 150, computing system 205, artifact repository 130c, software development pipeline 210a, and profile generation process 255 may be similar, if not identical, to control system 115, user device(s) 150, computing system 205, artifact repository 130c, software development pipeline 210a, and profile generation process 255, respectively, of the example data flow 200 of FIG. 2. The description of these components of the example data flow 200 of FIG. 2 are similarly applicable to the corresponding components of FIG. 3.

With reference to the example data flow 300 of FIG. 3, computing system 205, at operation 305, triggers a profile generation process 255, which is performed within the software development pipeline 210a. As shown in the example data flow of FIG. 2, the software build process 235 is also performed within the software development pipeline 210a. During the profile generation process 255, a process 310 for static analysis of artifacts is performed, during which the artifacts are accessed from the artifact repository 130c (at operation 315) and system API usage data 325 is output (at operation 320). The process 310 for static analysis of artifacts is performed without executing the software program. The process 310 may further include analyzing machine code (and/or binaries) of the software program to scan for and to map every possible control flow paths. In some examples, scanning for and mapping of possible control flow paths may include starting from each entry point in a main portion of the machine code and any libraries it uses as contained in the artifacts, until each control flow path among the plurality of control flow paths in the machine code has been scanned and mapped. A CFG may be generated based on the scanning for and mapping of possible control flow paths. In examples, invocations of system calls in possible code paths of the software program are identified using the CFG. In some examples, the system API usage data is generated based on the identified invocations of system calls in (each) possible code path of the software program.

In some examples, the analysis process (at operation 310) is performed using a software development tool (e.g., Sysfilter). In general, a software development tool is a computer program that is used during software development to create, debug, maintain, or otherwise support other programs and applications. In this case, the software development tool reads the machine code in an executable (e.g., the artifact) and follows every possible flow in the code from every possible entry point, with the first operation that the executable performs on execution being the entry point. Often times, executables have more than one entry point, and the process is repeated from each entry point. After travelling through the executable and its dependencies (e.g., shared libraries, other executables the main portion of the code uses), the software development tool creates the CFG. Using the CFG, the software development tool identifies every instance that the special operation 'syscall' is used. Calling 'syscall' is the way a program calls for a system call, which is the interface with the operating system. By analyzing the code before the invocation of 'syscall,' the software development tool then determines what possible values a certain register may have. The value in this register determines which system call is being used (e.g., read a file, send data over a network, query for information about the operating system). The software development tool compiles a list of these values and returns them as output. These values are subsequently converted to the name of the actual system calls in the relevant platform, where the meaning of each value can change for different kernel versions.

At operation 330, the computing system 205 triggers platform-specific enforcement profile creation 335, during which the system API usage data 325 is input (at operation 340), the platform-specific configuration is read from artifact repository 130c (at operation 345), and the platform-specific enforcement profile 355 is output (at operation 350). In some examples, instead of the computing system 205 triggering the platform-specific enforcement profile creation 335, the platform-specific enforcement profile creation 335 is triggered by the system API usage data 325 being received or input (at operation 340) from the output of the static analysis of artifacts 310 (at operation 320). The platform-specific enforcement profile 355 is then stored on the artifact repository 130c, at operation 360. As described above, the enforcement profile, when applied to the software program, defines actions that the software program is allowed to perform, while blocking other actions, thereby protecting the system on which the software program is deployed or executed. Applying the enforcement profile to the software program may be performed within the software deployment pipeline 210b of FIG. 2.

In examples, a wrapper function or a wrapper function API is used (a) to access the artifacts automatically from the artifact repository 130c (at operation 315), (b) to implement analysis tools for automatically generating system API usage data (at operation 310), and (c) to output the system API usage data (at operation 320). A wrapper function, as used herein, refers to a function or subroutine in a software library or a computer program (in this case, in the software development pipeline 110 or the control system 115 of the software development system 105 or of the software development pipeline 210*a*). The function or subroutine of the wrapper function is configured to call a second subroutine or to call the system with little or no additional computation, and, referring to the examples above, is configured to call an analysis tool or software development tool (e.g., Sysfilter) to perform the analysis to generate system API usage data. Computer program, as used herein, refers to the program for implementing automatic profile generation, while software program refers to the program for which profile generation is performed to harden said software program.

Figure 4A:
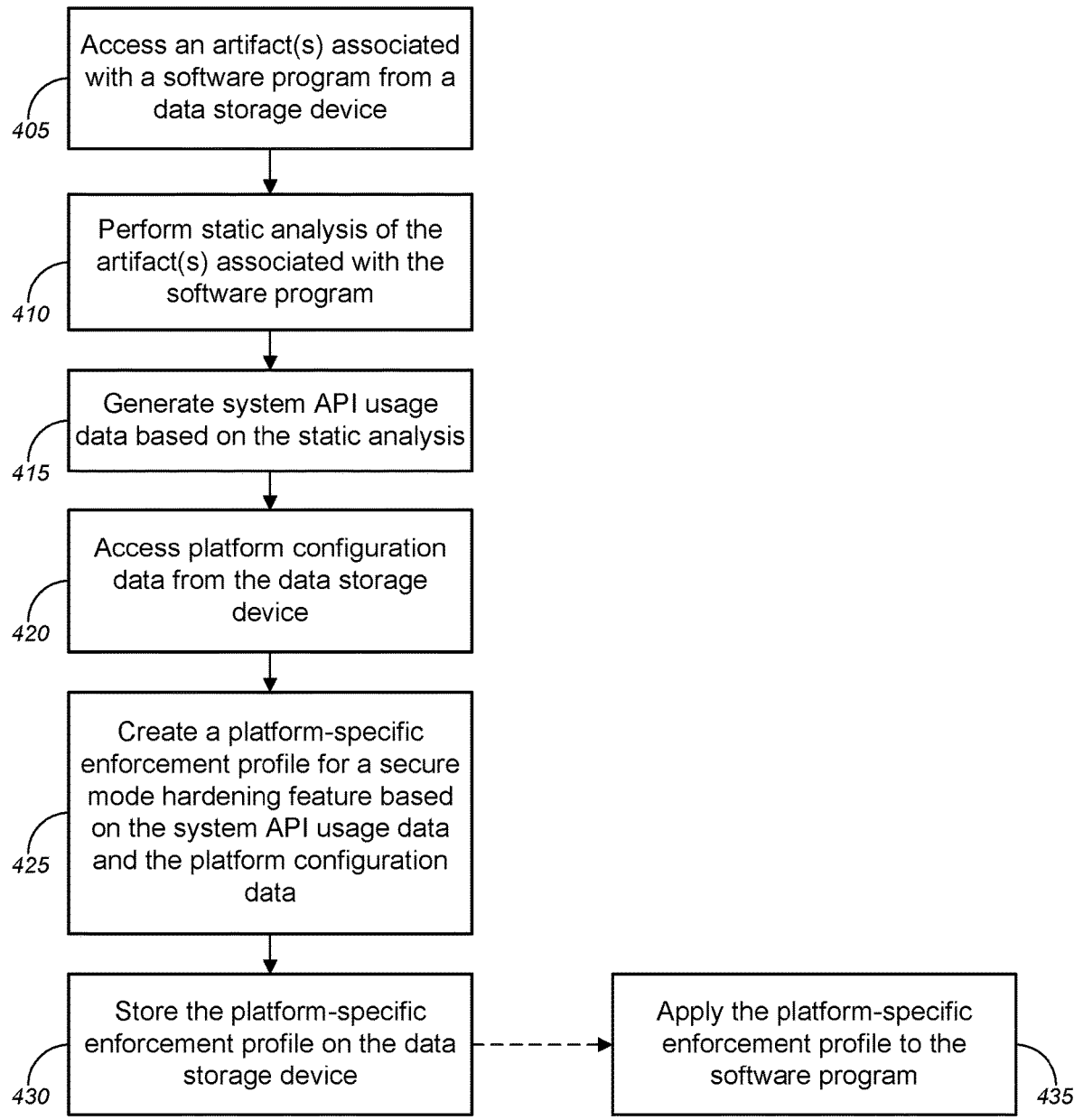
FIGS. 4A and 4B depict an example method for implementing automatic runtime execution hardening for software programs.
Figure 4B:
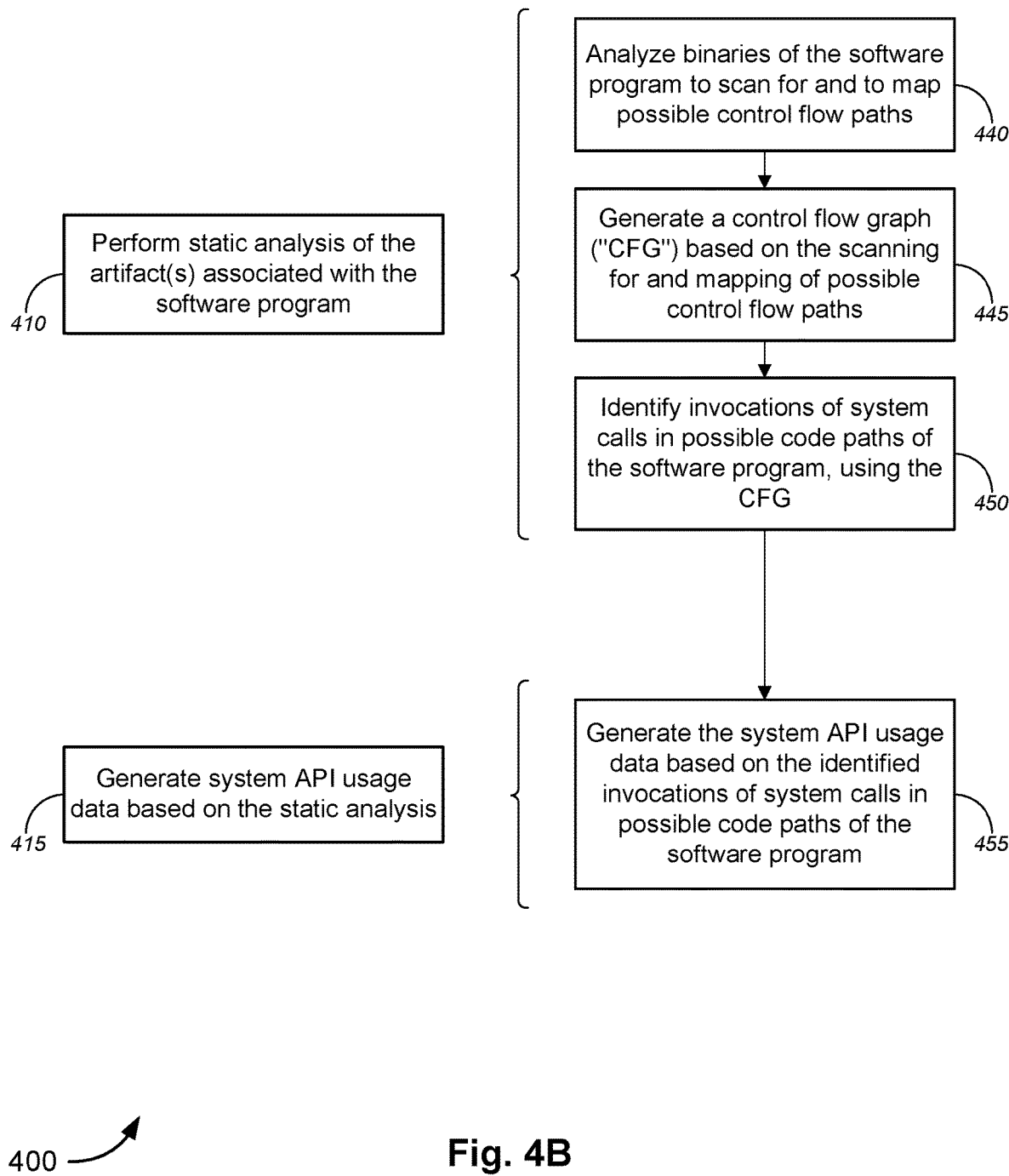

FIGS. 4A and 4B depict example methods 400 for implementing automatic runtime execution hardening for software programs. While the techniques and procedures are depicted and/or described in a certain order for purposes of illustration, it should be appreciated that certain procedures may be reordered and/or omitted within the scope of various embodiments. The operations of method 400 may be performed by one or more computing devices, such as the devices discussed in the various systems above. In some examples, the operations of method 400 are performed by a computing device operating as the computing system or the software development system.

In the example method of FIG. 4A, operations 405-430 may be performed within a software development environment of a software development pipeline in which either source code of a software program is compiled to create an executable software program or source code of the software program is translated into an executable programming or scripting language without compiling into a machine language program. Operation 435 may be performed within a production or deployment environment of a software deployment pipeline in which the software program is configured for deployment, and ultimately deployed. In examples, the operations are performed by a computing system (e.g., the software development system or the control system of the software development system). In some cases, the software program includes one of a software application, a software package, or an operating system.

At operation 405, the computing system accesses (e.g., receives or pulls) an artifact(s) associated with a software program from a data storage device, such as data storage device(s) 130 of FIGS. 1-3. In examples, the artifact(s) include executable files, library files, binaries (including machine code), data files, configuration files, data models, deployment scripts, database definitions, or raw data input files in various formats (e.g., JSON, XML, Dat files). At operation 410, the computing system performs static analysis of the artifact(s) associated with the software program. Static analysis is performed without executing the software program. Method 400, at operation 415, may include the computing system generating system API usage data based on the static analysis at operation 410.

In an example, the computing system performs static analysis of the artifact(s) associated with the software program, i.e., without executing the software program, and the system API usage data is generated based on static analysis of the artifact(s). In another example, the computing system analyzes, in particular, the binaries associated with the software program, without executing the software program, and the system API usage data is generated based on analysis of the binaries. In yet another example, the computing system analyzes, in particular, the machine code associated with the software program, without executing the software program, and the system API usage data is generated based on analysis of the machine code. In some instances, the binaries or the machine code is stored on the data storage device during or after creation of the executable software program, and may subsequently be accessed from the data storage device for the static analysis at operation 410 (where applicable). FIG. 4B, as described in detail below, illustrates an example of analysis of the at least one of the artifact(s) or the machine code.

The computing system accesses platform configuration data from the data storage device, at operation 420. In some examples, the platform configuration data that is accessed from the data storage device (at operation 420) is the same platform configuration data that is used when compiling or translating the source code of the software program to create the executable software program. In such examples, the platform configuration data is stored on the data storage device during or after creation of the executable software program and prior to the artifact(s) being received or accessed from the data storage device at operation 405.

At operation 425, the computing system creates a platform-specific enforcement profile for a secure mode hardening feature based on the system API usage data (from operation 415) and the platform configuration data (from operation 420). The platform-specific enforcement profile, at operation 430, is then stored on, or pushed to, the data storage device. In some examples, accessing the artifact(s) (at operation 405) and accessing the platform configuration data (at operation 420) are each performed using a wrapper function API. When applied to the software program, such as at optional operation 435, the platform-specific enforcement profile defines actions that the software program is allowed to perform, while blocking other actions. In this manner, the platform-specific enforcement profile protects the system on which the software program is executed from potential harm caused by a compromised software program. In some examples, the platform-specific enforcement profile does so by preventing a compromised software program from using any of the blocked system calls or other actions (e.g., accessing sensitive information, modifying files, or making network connections) and by only allowing it to use the system calls or other actions defined in the platform-specific enforcement profile.

With reference to FIG. 4B, performing the static analysis of the artifact(s) (i.e., analyzing the artifact(s), without executing the software program), at operation 410, may include, at operation 440, analyzing the binaries of the software program to scan for and to map possible control flow paths. In some examples, scanning for and mapping of possible control flow paths may include starting from each entry point in a main portion of the machine code and any libraries it uses as contained in the artifact(s), until each control flow path among the plurality of control flow paths in the machine code have been scanned and mapped. At operation 445, a CFG may be generated based on the scanning for and mapping of possible control flow paths. In examples, invocations of system calls in possible code paths of the software program are identified, at operation 450, using the CFG. In some examples, generating the system API usage data (at operation 415) may include generating the system API usage data based on the identified invocations of system calls in possible code paths of the software program, at operation 455.

Although the various embodiments are described with respect to a full enforcement mode, during which unintended calls are blocked, an audit mode may alternatively be implemented. During an audit mode, the hardening profile may monitor and record the allowed or the to-be-blocked calls, but does not actually block unintended calls. By enabling an option to switch between the full enforcement mode and the audit mode, the system can be used to validate and increase trust to the users of the system by running in either mode as necessary or as desired. Unintended calls, as used herein, refers to calls that perform tasks that are unintended or counter to normal operation of a program or system. For example, during a video processing operation, the enforcement profile may prevent a system call such as "clock_adjtime", which changes the OS clock time and is counter to the intended operations of the video processing program. Because the enforcement profile can operate in several modes, there are different unintended calls for each mode. For instance, for an enforcement profile with allowed calls, any call that is not on the list of allowed calls is an unintended call. In contrast, for an enforcement profile with blocked calls, the default action is to allow calls, hence dedicated sections with a "SCMP_ACT_ERRNO" notation will be blocked. For an enforcement profile with audit mode, all the calls are allowed and the enforcement profile monitors which allowed or disallowed actions would have been blocked if the enforcement profile was enforcing and not just auditing.

While the method 400 illustrated by FIGS. 4A and 4B can be implemented by or with (and, in some cases, are described above with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIGS. 4A and 4B (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 5:
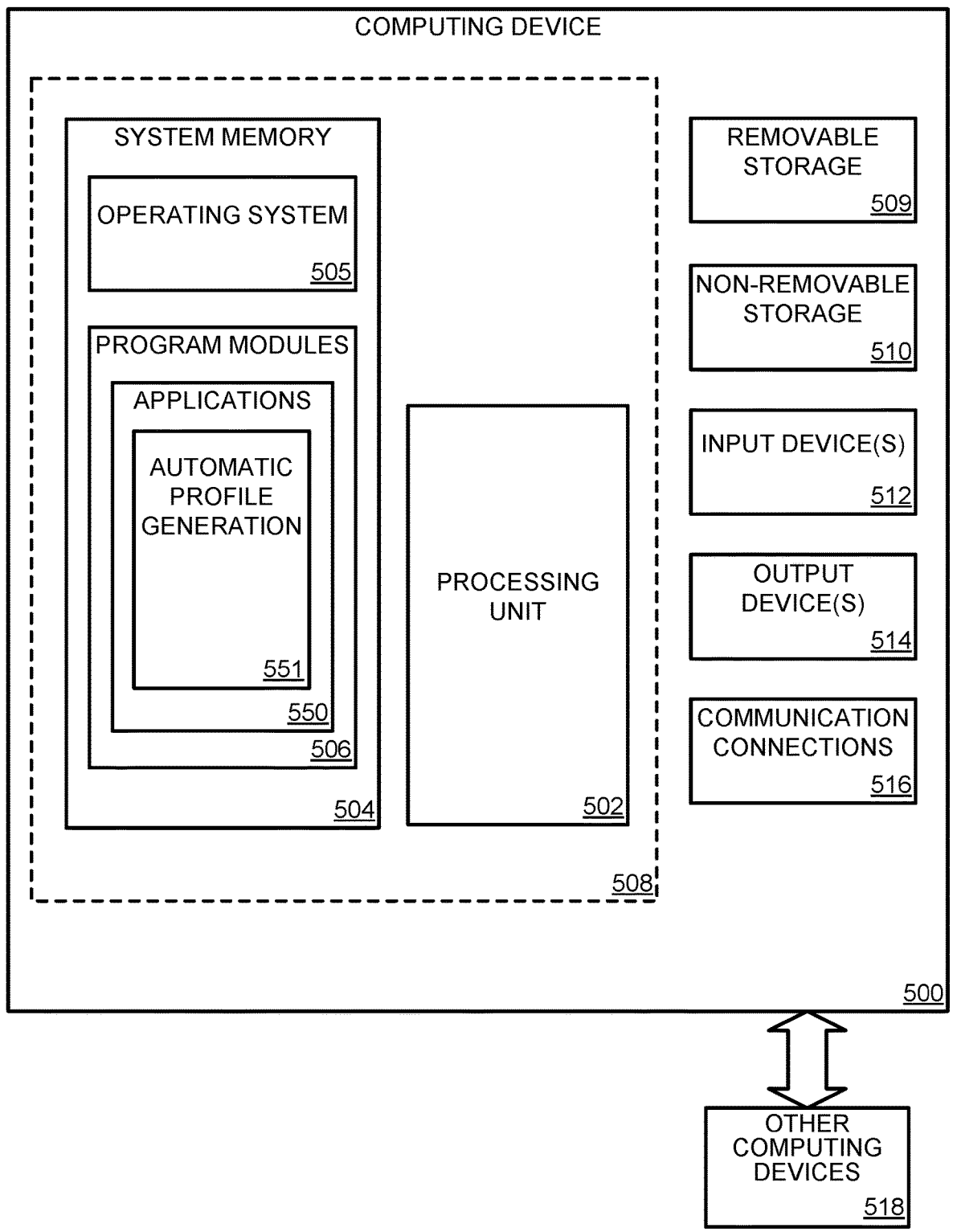
FIG. 5 depicts a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing automatic runtime execution hardening for software programs undergoing software development and/or deployment, as discussed above. In a basic configuration, the computing device 500 includes at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as automatic profile generation application 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit(s) 502, the program modules 506 may perform processes including one or more of the operations of the method(s) as illustrated in FIG. 4, or one or more operations of the system(s) and/or apparatus(es) as described with respect to FIG. 1-3, or the like. Other program modules that may be used in accordance with examples of the present invention may include applications such as electronic mail and contacts applications, word processing applications, spreadsheet applications, database applications, slide presentation applications, drawing or computer-aided application programs, AI applications and machine learning ("ML") modules on cloud-based systems, etc.

Furthermore, examples of the present disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture that can be used to store information and that can be accessed by the computing device 500. Any such computer storage media may be part of the computing device 500. Computer storage media may be non-transitory and tangible, and computer storage media does not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In an aspect, the technology relates to a system. The system includes a processing system and memory coupled to the processing system. The memory includes computer executable instructions that, when executed by the processing system, causes the system to perform operations including performing a static analysis of an artifact associated with a software program; and generating system application programming interface ("API") usage data based on the static analysis. The operations also include creating a platform-specific enforcement profile for a secure mode hardening feature based on the system API usage data and platform configuration data, the platform-specific enforcement profile defining allowed requests and blocked requests for the software program. The operations further include storing the platform-specific enforcement profile on a data storage device.

In some embodiments, the static analysis includes scanning for and mapping possible control flow paths by analyzing the artifact; generating a control flow graph ("CFG") based on the scanning for and mapping of possible control flow paths; and identifying invocations of system calls in possible code paths of the software program, using the CFG. In examples, generating the system API usage data includes generating the system API usage data based on the identified invocations of system calls in possible code paths of the software program. In some examples, the artifact includes machine code. In examples, the scanning for and mapping of possible control flow paths includes scanning for and mapping of possible control flow paths starting from each entry point in a main portion of the machine code and any libraries it uses as contained in the artifact, until control flow paths in the machine code have been scanned and mapped.

According to some embodiments, the operations further include applying the platform-specific enforcement profile to the software program. In examples, applying the platform-specific enforcement profile to the software program causes blocking of requests that are not listed as being allowed.

In some examples, the operations further include accessing the artifact from the data storage device; and accessing the platform configuration data from the data storage device. In some instances, accessing the artifact includes pulling the artifact from the data storage device. In some cases, accessing the platform configuration data includes pulling the platform configuration data from the data storage device. In an example, storing the platform-specific enforcement profile includes pushing the platform-specific enforcement profile to the data storage device. According to some embodiments, pulling the artifact and pulling the platform configuration data are each performed using a wrapper function API. In some instances, the platform configuration data is used when compiling or translating source code of the software program to create an executable software program, the platform configuration data having been stored on the data storage device during or after creation of the executable software program and prior to the artifact being analyzed. In some embodiments, the artifact includes at least one of executable files, library files, binaries, data files, configuration files, data models, deployment scripts, database definitions, or input files.

In another aspect, the technology relates to a computer-implemented method, including, within a software development environment in which source code of a software program is compiled or translated to create an executable software program, performing operations. The operations include performing a static analysis of an artifact associated with the software program; generating system application programming interface ("API") usage data based on the static analysis; and creating a platform-specific enforcement profile for a secure mode hardening feature based on the system API usage data and platform configuration data. The platform-specific enforcement profile defines allowed system calls and blocked system calls for the software program. The operations further include storing the platform-specific enforcement profile to a data storage device; and, within a software deployment environment in which the software program is configured for deployment, applying the platform-specific enforcement profile to the software program.

In some examples, the artifact includes machine code, wherein analyzing the artifact, without executing the software program, includes analyzing the artifact to scan for and to map possible control flow paths, starting from each entry point in a main portion of the machine code and any libraries it uses as contained in the artifact, until control flow paths in the machine code have been scanned and mapped. Analyzing the artifact further includes generating a control flow graph ("CFG") based on the scanning for and mapping of possible control flow paths; and identifying invocations of system calls in possible code paths of the software program, using the CFG. In some cases, generating the system API usage data includes generating the system API usage data based on the identified invocations of system calls in possible code paths of the software program.

According to some embodiments, the method further includes accessing the artifact from the data storage device; and accessing the platform configuration data from the data storage device. In some cases, accessing the artifact includes pulling the artifact from the data storage device. In some instances, accessing the platform configuration data includes pulling the platform configuration data from the data storage device. In an example, storing the platform-specific enforcement profile includes pushing the platform-specific enforcement profile to the data storage device. In some embodiments, pulling the artifact and pulling the platform configuration data are each performed using a wrapper function API.

In yet another aspect, the technology relates to a system including a processing system and memory coupled to the processing system. The memory includes computer executable instructions that, when executed by the processing system, causes the system to perform operations. The operations include, within a software development environment in which source code of a software application ("app") is compiled or translated to create an executable software program, generating system application programming interface ("API") usage data based on a static analysis of an artifact associated with the software application. The operations also include creating a platform-specific enforcement profile for a secure mode hardening feature based on the system API usage data and platform configuration data, the platform-specific enforcement profile defining allowed system calls and blocked system calls for the software program. The operations further include pushing the platform-specific enforcement profile to the data storage device.

In some embodiments, the operations further include pulling, using a wrapper function API, the artifact associated with the software application and platform configuration data from a data storage device; and performing the static analysis of the artifact associated with the software application. In examples, the data storage device includes an artifact storage device, wherein the artifact is pulled from the artifact storage device, wherein the platform-specific enforcement profile is pushed to the artifact storage device. In some examples, the artifact includes binaries of the software program. In an example, analyzing the artifact, without executing the software program, includes analyzing the binaries of the software program to scan for and to map possible control flow paths; generating a control flow graph ("CFG") based on the scanning for and mapping of possible control flow paths; and identifying invocations of system calls in possible code paths of the software program, using the CFG. In some examples, generating the system API usage data includes generating the system API usage data based on the identified invocations of system calls in possible code paths of the software program.

According to some embodiments, the binaries of the software program include machine code. In some examples, the scanning for and mapping of possible control flow paths includes scanning for and mapping of possible control flow paths starting from each entry point in a main portion of the machine code and any libraries it uses as contained in the artifact, until control flow paths in the machine code have been scanned and mapped.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:
a processing system; and
memory coupled to the processing system, the memory comprising computer executable instructions that, when executed by the processing system, causes the system to perform operations comprising:
performing a static analysis of an artifact associated with a software program, wherein the static analysis comprises:
scanning for and mapping possible control flow paths by analyzing entry points of a main portion of machine code of the artifact and analyzing libraries used by the main portion of machine code;
generating a control flow graph ("CFG") based on the scanning for and mapping of possible control flow paths; and
identifying invocations of system calls in possible code paths of the software program, using the CFG;
generating system application programming interface ("API") usage data based on the static analysis;
creating a platform-specific enforcement profile for a secure mode hardening feature based on the system API usage data and platform configuration data, the platform-specific enforcement profile defining allowed requests and blocked requests for the software program; and
storing the platform-specific enforcement profile on a data storage device.

2. The system of claim 1, wherein
generating the system API usage data comprises generating the system API usage data based on the identified invocations of system calls in possible code paths of the software program.

3. The system of claim 1, wherein the scanning for and mapping of possible control flow paths comprises scanning the possible control flow paths starting from each entry point in the main portion of the machine code, until control flow paths in the machine code have been scanned and mapped.

4. The system of claim 1, wherein the operations further comprise: applying the platform-specific enforcement profile to the software program.

5. The system of claim 4, wherein applying the platform-specific enforcement profile to the software program causes blocking of requests that are not listed as being allowed.

6. The system of claim 1, wherein the operations further comprise:
accessing the artifact from the data storage device; and
accessing the platform configuration data from the data storage device.

7. The system of claim 6, wherein:
accessing the artifact comprises pulling the artifact from the data storage device;
accessing the platform configuration data comprises pulling the platform configuration data from the data storage device; and
storing the platform-specific enforcement profile comprises pushing the platform-specific enforcement profile to the data storage device.

8. The system of claim 7, wherein pulling the artifact and pulling the platform configuration data are each performed using a wrapper function API.

9. The system of claim 6, wherein the platform configuration data is used when compiling or translating source code of the software program to create an executable software program, the platform configuration data having been stored on the data storage device during or after creation of the executable software program and prior to the artifact being analyzed.

10. The system of claim 1, wherein the artifact comprises at least one of executable files, library files, binaries, data files, configuration files, data models, deployment scripts, database definitions, or input files.

11. A computer-implemented method, comprising:
within a software development environment in which source code of a software program is compiled or translated to create an executable software program, performing the following operations:
performing a static analysis of an artifact associated with the software program, wherein the static analysis comprises:
scanning for and mapping possible control flow paths by analyzing entry points of a main portion of machine code of the artifact and analyzing libraries used by the main portion of machine code;
generating a control flow graph ("CFG") based on the scanning for and mapping of possible control flow paths; and
identifying invocations of system calls in possible code paths of the software program, using the CFG;
generating system application programming interface ("API") usage data based on the static analysis;
creating a platform-specific enforcement profile for a secure mode hardening feature based on the system API usage data and platform configuration data, the platform-specific enforcement profile defining allowed system calls and blocked system calls for the software program; and
storing the platform-specific enforcement profile to a data storage device; and
within a software deployment environment in which the software program is configured for deployment, applying the platform-specific enforcement profile to the software program.

12. The computer-implemented method of claim 11,
wherein generating the system API usage data comprises generating the system API usage data based on the identified invocations of system calls in possible code paths of the software program.

13. The computer-implemented method of claim 11, further comprising:
accessing the artifact from the data storage device; and
accessing the platform configuration data from the data storage device.

14. The computer-implemented method of claim 13, wherein:
accessing the artifact comprises pulling the artifact from the data storage device;
accessing the platform configuration data comprises pulling the platform configuration data from the data storage device; and
storing the platform-specific enforcement profile comprises pushing the platform-specific enforcement profile to the data storage device.

15. The computer-implemented method of claim 14, wherein pulling the artifact and pulling the platform configuration data are each performed using a wrapper function API.

16. A system, comprising:
a processing system; and
memory coupled to the processing system, the memory comprising computer executable instructions that, when executed by the processing system, causes the system to perform operations comprising:
within a software development environment in which source code of a software application is compiled or translated to create an executable software program, generating system application programming interface ("API") usage data based on a static analysis of an artifact associated with the software application, wherein the static analysis comprises:
scanning for and mapping possible control flow paths by analyzing entry points of a main portion of machine code of the artifact and analyzing libraries used by the main portion of machine code;
generating a control flow graph ("CFG") based on the scanning for and mapping of possible control flow paths; and
identifying invocations of system calls in possible code paths of the executable software program, using the CFG;
creating a platform-specific enforcement profile for a secure mode hardening feature based on the system API usage data and platform configuration data, the platform-specific enforcement profile defining allowed system calls and blocked system calls for the executable software program; and
pushing the platform-specific enforcement profile to a data storage device.

17. The system of claim 16, wherein the operations further comprise:
pulling, using a wrapper function API, the artifact associated with the software application and platform configuration data from a data storage device; and
performing the static analysis of the artifact associated with the software application.

18. The system of claim 17, wherein the data storage device comprises an artifact storage device, wherein the artifact is pulled from the artifact storage device, wherein the platform-specific enforcement profile is pushed to the artifact storage device.

19. The system of claim 17, wherein the artifact comprises binaries of the executable software program, and
wherein-generating the system API usage data comprises generating the system API usage data based on the identified invocations of system calls in possible code paths of the executable software program.

20. The system of claim 19, wherein the scanning for and mapping of possible control flow paths comprises scanning for and mapping of possible control flow paths starting from each entry point in the main portion of the machine code, until control flow paths in the machine code have been scanned and mapped.

* * * * *